US008841535B2

(12) United States Patent
Collins

(10) Patent No.: US 8,841,535 B2
(45) Date of Patent: Sep. 23, 2014

(54) METHOD AND SYSTEM FOR VISUAL REPRESENTATION OF SOUND

(76) Inventor: Karen Collins, Waterloo (CA)

(*) Notice: Subject to any disclaimer, the term of this patent is extended or adjusted under 35 U.S.C. 154(b) by 399 days.

(21) Appl. No.: 13/142,373

(22) PCT Filed: Dec. 30, 2009

(86) PCT No.: PCT/CA2009/001902
§ 371 (c)(1),
(2), (4) Date: Aug. 10, 2011

(87) PCT Pub. No.: WO2010/075634
PCT Pub. Date: Jul. 8, 2010

(65) Prior Publication Data
US 2011/0283865 A1 Nov. 24, 2011

Related U.S. Application Data

(60) Provisional application No. 61/141,486, filed on Dec. 30, 2008.

(51) Int. Cl.
*G10H 1/00* (2006.01)
*G10H 1/18* (2006.01)
*G10H 7/00* (2006.01)
*G06F 3/16* (2006.01)
*G06F 3/0481* (2013.01)
*G09B 21/00* (2006.01)

(52) U.S. Cl.
CPC .............. *G06F 3/04817* (2013.01); *G06F 3/16* (2013.01); *G09B 21/009* (2013.01)
USPC ........................................... 84/615; 715/727

(58) Field of Classification Search
USPC ............ 84/615, 653, 626, 662; 715/727, 728, 715/764, 836–839, 857, 858, 861
See application file for complete search history.

(56) References Cited

U.S. PATENT DOCUMENTS

| 5,812,688 | A | * | 9/1998 | Gibson | 381/119 |
| 5,850,455 | A | * | 12/1998 | Arnold et al. | 381/17 |
| 6,140,565 | A | * | 10/2000 | Yamauchi et al. | 84/600 |
| 7,928,311 | B2 | * | 4/2011 | Trivi et al. | 84/645 |
| 2006/0095864 | A1 | | 5/2006 | Mock | |
| 2008/0074486 | A1 | | 3/2008 | Robinson | |

FOREIGN PATENT DOCUMENTS

EP 0650114 4/1995
WO 99/21169 4/1999

OTHER PUBLICATIONS

PCT International Searching Authority (CA), International Search Report, Mar. 19, 2010, PCT/CA2009/001902.
PCT International Searching Authority (CA), The Written Opinion of the International Searching Authority, Mar. 19, 2010, PCT/CA2009/001902.

(Continued)

*Primary Examiner* — Jeffrey Donels
(74) *Attorney, Agent, or Firm* — Borden Ladner Gervais LLP; Neil Henderson

(57) ABSTRACT

A system and method for visual representation of sound, wherein the system and method obtain sound information from a multimedia content; generate an icon based on the sound information obtained; generate a directional indicator based on the sound information; and then display the icon and the directional indicator on a display screen. The sound information typically includes various attributes that can be mapped to various properties of the display elements (icon and directional indicator) to provide details relating to the sound via a visual display.

14 Claims, 9 Drawing Sheets

(56) References Cited

OTHER PUBLICATIONS

PCT International Searching Authority (CA), International Preliminary Report on Patentability, Jul. 14, 2011, PCT/CA2009/001902.

Goldenson, "Beat Browser", Jul. 2007, Master of Science Thesis at the Massachusetts Institute of Technology, accessed from the internet on Jan. 27, 2010 at: http://web.media.mit.edu/~jdg/Thesis/BeatBrowser.pdf, 51 pages.

* cited by examiner

| Sound Effect | Alpha | Symbol |
|---|---|---|
| Alarm /siren | A | 🔔 |
| Bad/warning generic | B | ✗ |
| Check weapon | C | !> |
| Door bell/ knock/door open/close | D | ▮ |
| Electricity/machine noises | E | ⚡ |
| Footsteps | F | ! |
| Gunfire | G | ➤ |
| Human noises grunt/breathing | H | ⓘ |
| Fire | I | 🔥 |
| Jabber/ talking/walla | J | ᴑᴒ |
| Ka-boom explosion | K | 💣 |
| gLass breaking | L | ▦ |
| Timer | M | ⊕ |
| Noise, generic | N | ! |
| Overhead vehicle | O | ✈ |
| Projectile launch | P | ✦ |
| eQuipment on/off | Q | ♦ |
| Radio /CB | R | ▯ |
| Scream/cry | S | ►O |
| Telephone | T | ☏ |
| Underwater sonar | U | ⊕ |
| Vehicle sounds | V | 🚗 |
| Water dripping/running | W | ∩ |
| X non-human sounds | X | ↔ |
| Yelling/calling | Y | ⓨ |
| Z generic good | Z | ✓ |

Figure 6

METHOD AND SYSTEM FOR VISUAL REPRESENTATION OF SOUND

FIELD

The present application relates generally to the visual representation of sound and, more particularly, relates to a method and system for the visual representation of sound effects in multimedia.

BACKGROUND

Sound—and particularly sound effects—are ubiquitous in multimedia experiences such as video games, simulations, virtual worlds, and computer applications. In each case, sound can serve many important functions and provide additional information that accompanies visual images. It is believed that each form of sensory information appeals to a different type of memory.

In video games, for example, sound adds information to the narrative, foreshadows events and actions, hints at off-screen action, serves as symbols or leitmotifs for characters and locations, creates a sense of time and place, provides proximity and location cues of adversaries, and most importantly, warns the player to take a particular action. In many cases, playing without the sound in a game leads the player into peril. For example, in many stealth games (a sub-genre of popular first-person shooters), sound cues can inform the players of nearby enemies, and may also cue enemies to the player's whereabouts. Such use of audio indicates that sound can be a very significant element of gameplay. A limited research project has studied the reaction of gamers to games with and without sound in a game. The responses of the participants indicate the importance of sound in games: "The first thing I notice is that my time of reaction has increased by ten . . . "; "I didn't always notice things happening". (Jørgensen, K. 2008. "Left in the dark: playing computer games with the sound turned off" in Collins, K (Editor). *From Pac-Man to Pop Music*, Aldershot: Ashgate, pp. 163-176.) These quotes hint at several important factors: most importantly, sound enables shorter learning curves and guides a player through a game. In a document for mobile phone game developers, Nokia Corporation points out, "From a cognitive point of view, the auditory channel is an excellent way to relay information and give feedback to the player. While the background music can be used to enhance the emotions and mood of the game, a specific sound effect can be used to communicate meaningful game information" (Nokia Corporation, From Beeps to Soundscapes: Designing Mobile Game Audio, 2005, online: Nokia <http://sw.nokia.com/id/e2b3d80a-5ea7-453b-978e-1814310b4639/From_Beeps_To_Soundscapes_Designing_Mobile_Game_Audio_v1_0_en.pdf/>)/

Both auditory and visual channels can be important avenues in communicating information to a user. However, there are several reasons why an alternative to sound cues is needed in multimedia. The reasons include: that the user is hearing impaired, the user wishes to engage in the activity without the audio, or that there is interference which affects the perception and interpretation of the audio signal by the user.

A significant portion of the public is hearing impaired, and therefore may completely miss the cues that are provided by sound in multimedia. In North America, the "1 in 10" statistic is often used, to indicate that one in ten people have some form of hearing disability (hear-it AISBL (2005), "35 million North Americans suffer from hearing loss", http://www.hear-it.org/page.dsp?area=858). While many of these hearing impaired are elderly, there are also significant numbers of deaf children and young adults. In the USA, for instance, there are approximately a million hearing impaired children and approximately 65000 deaf children (Omer Zak (1995), "Demographic data about the hearing impaired in USA", http://www.zak.co.il/d/deaf-info/old/demographics). There have been few attempts to solve hearing accessibility problems or to provide some sound alternative. The use of sound can be an intrusive activity. Indeed, mobile video games in particular may benefit from providing some alternative to audio cues. The assumption is that these devices are often used in a public space and therefore the user is either using headphones or with sound off. Another reason a user may want to turn the sound off is due to listener fatigue. Being exposed to the same sound environment for a lengthy amount of time and hearing many sounds can get tiring, and therefore the user may want periods of silence but without missing the information provided by those audio cues.

In addition to games, of course, there are many applications which can make use of alternate representations of sound, including videos (online or offline—including those of an instructional nature, in which sound may indicate instructions to a viewer), TV, DVD, real-time simulations, virtual worlds, computer applications, heads-up displays, as well as PDAs and other handheld devices where a user may wish to watch a video, use interactive applications or games, or communicate. The alternate representation of sound may even be useful in military applications, such as for use with heads-up displays, or in industrial applications, such as warning systems for loud environments or devices to accommodate hearing impairment. Each of these multimedia applications faces the same problem of finding viable alternatives to convey the same complex information that is available from sound cues.

Possible alternatives to sound cues use different human sensory inputs such as sight or touch to rely similar information to the user. Each alternative faces the problem of interpretation and translation between different sensory information and the ability to deliver the information to the user in a timely manner.

Captioning for television and videos represents one form of visual alternative to audio cues. Captioning provides a text based description of the audio segment of a multimedia content (Gary Robson, *The Closed Captioning Handbook*, Gulf Professional Publishing, 2004). Text based descriptions may have the following drawbacks: interpretation, language dependence and integration in existing systems. Captioning typically relies on a person to describe the audio information in text and as a result is prone to be subjective. Text descriptions are generally limited by the reading comprehension skills of the end user and are often less expressive than the original audio information. Moreover, it may be difficult to represent positional information of the audio cues without obscuring the image.

There have been attempts to overcome the limitation of captioning technology using highlighting and simple animations. Color coding of captioned text is used sometimes to distinguish between speakers, and may show a speaker portrait of the speaking character next to the caption or to emphasize a particular descriptive text (King, C., Lasasso, C. J., Short, D. D. 1994. "Digital Captioning: Effects of Color Coding and Placement in Synchronized Text-Audio Presentations." ERIC research report.ED388265). Speech balloons (Action captions), similar to those found in comic books, for example, may help to tell the user which character is speaking, or where a sound source is emanating (Richard A. van Tol (2006), "The Sound Alternative. Game Accessibility". http://www.accessibility.nl/games/ index.php?pagefile=soundalternative). Speech balloons can also be used to indicate events that have been typically used to represent sound effects, for example, a balloon may be used in conjunction with a sound change to indicate approaching enemy. The idea of active captions can be extended to include animated speaker portraits or avatars that can increase readability by showing facial expressions to add context. Each of these methods is limited because they still rely on text to convey the audio information.

Other visual alternatives to audio information are generally simplistic, static and/or representative of only one type of information. A threat meter in a first-person shooter game such as Omen Threat Meter™, a custom-made plug-in for World of Warcraft™ game, (WOWAce (2007), Omen, http://www.wowace.com/addons/omen-threat-meter/) is used to show the danger levels being encountered based on the sound in the game. The ability to show only one parameter, in this example, the level of danger, limits the amount of information being conveyed for such graphic display techniques.

In some video games, more complex visual display methods, such as using animations, have been used. However, these animation methods are limited to a few selected sounds. For example, the game Sims 3™ (2009), Electronic Arts, http://www.thesims3.com/) uses a visual representation of vibration and musical notes to indicate the telephone ringing and music playing. However, this use of animation is limited to visible (on-screen) elements, each animation is generally tied only to one isolated event in a game rather than on-going information or more detailed information about the nature of the event and, as such, this method does not provide enough information with regard to audio cues.

Videos or animations of sign language could possibly be implemented to address the complex information provided by sound cues. However, animated sign language suffers from the same disadvantages as captioning technology. In addition, this method is believed to have the difficulty of distracting the player for long periods from on-screen action. Likewise, picture-in-picture or split-screen video clips that show details of auditory information that may be happening off-screen are generally considered too distracting and to require considerable extra programming.

Other alternatives to visual cues use another sense such as touch to convey the same information. It is possible, for instance, to use the sub-woofer to convey information through the vibrations that occur with loud bass sounds, although other than a message that there is some kind of sound occurring, the communication is limited. Vibrations are used in cell phones set to a silent mode to indicate that the phone is ringing. These alternatives are generally very simplistic representations of the sound cues and are typically not able to provide the rich audio information that is available.

In summary, there are limitations in the conventional approaches. Moreover, there are as yet no standards, such that conventional approaches are used sporadically, and they require considerable extra programming effort (and therefore cost). As such, it is desired to provide an improved system and method of communicating the information currently communicated through the use of sound that overcomes at least some of the limitations of conventional systems and methods.

SUMMARY

According to one aspect herein, there is provided a method of visual representation of sound, the method including: obtaining sound information; generating an icon based on the sound information; generating a directional indicator based on the sound information; and displaying the icon and the directional indicator on a display screen.

In a particular case, the sound information may include information related to the type of sound, for use in generating the icon, and information related to the direction of the sound, for use in generating the directional indicator.

In one example of this case, the sound information may further include an additional attribute related to the sound. In particular, the generating an icon based on the sound information includes: generating the icon based on the information related to the type of sound; and adjusting a property related to the icon based on the additional attribute related to the sound. In this particular arrangement, the additional attribute related to the sound may include at least one of a variable representing the proximity of the sound, a variable representing the relevance of the sound, a variable representing the intensity of the sound, or a variable representing the pitch of the sound, and the property related to the icon may include at least one of opacity, flashing, color, or size.

In another example of this particular case, the information related to the type of sound comprises an alphanumeric symbol that corresponds with an icon representing the type of sound in a database.

In still another example of this particular case, the generating the directional indicator based on the sound information may include: determining a direction with regard to a user's viewpoint based on the information related to the direction of the sound; and generating the directional indicator to point in the determined direction.

According to another aspect herein there is provided a system for visual symbolic representation of sound, the system including: an input module for receiving sound information; an icon generator for generating an icon based on the sound information received from the input module; a direction generator for generating a directional indicator based on the sound information from the input module; and an output module for outputting an icon and a directional indicator received from the icon generator and direction generator.

In a particular case, the sound information received from the input module may include information related to the type of sound, for use in generating the icon, and information related to the direction of the sound, for use in generating the directional indicator.

In this case, the sound information may further include an additional attribute related to the sound. In particular, the icon generator may be configured to: generate the icon based on the information related to the type of sound; and adjust a property related to the icon based on the additional attribute related to the sound. In this particular arrangement, the additional attribute related to the sound may include a variable representing the proximity of the sound, and the property related to the icon may include opacity. In another particular arrangement, the icon generator may adjust a property related to the icon based on the additional attribute related to the sound by: determining a distance between a representation of a user and a source of a sound; and adjusting the opacity of the icon to be darker based on the sound being more proximate.

In another example of the particular case, the information related to the type of sound may include an alphanumeric symbol that corresponds with an icon representing the type of sound in a database.

In still another example of the particular case, the direction generator may be configured to: determine a direction based on a user's viewpoint from the information related to the direction of the sound; and generate the directional indicator to function together with the icon and point in the determined direction.

In this new system and method, audio/sound information is intended to be defined in terms of discrete sound elements with defined attributes. Each sound element and its attributes can then be related to/mapped to one or more dynamic display elements or visual icons (symbols) and its/their display properties. The use of a symbolic syntax or symbolic language is intended to remove the limitations of text-based or complex video descriptions. The dynamic display properties of an icon are intended to allow the icon to convey more complex audio information. Using the methods and systems described herein, multimedia applications can be adapted to use a visual representation (e.g. the icon) to convey the sound information based on the relationship between the sound elements and its attributes and a symbol/icon and its display properties. Changes to the sound information are related directly to the changes in the display properties of the icon(s), as a result, the systems and methods can generally be applied to multi-media applications that operate in real-time.

BRIEF DESCRIPTION OF THE FIGURES

Embodiments will now be described, by way of example only, with reference to the attached Figures, wherein:

FIG. 6 shows a table illustrating the use of a font to represent sound icons or sound signs;

DETAILED DESCRIPTION

The following description relates to embodiments of a method and system for visual representation of sound (sometimes referred to as a sound imaging system) that is intended to overcome at least some of the limitations noted above. The system and method is intended to be: symbolic (not reliant on language); simple to use; cross-platform; modular; scalable and able to be rendered in black and white as well as color; and adaptable for future change or specific needs.

Figure 1:
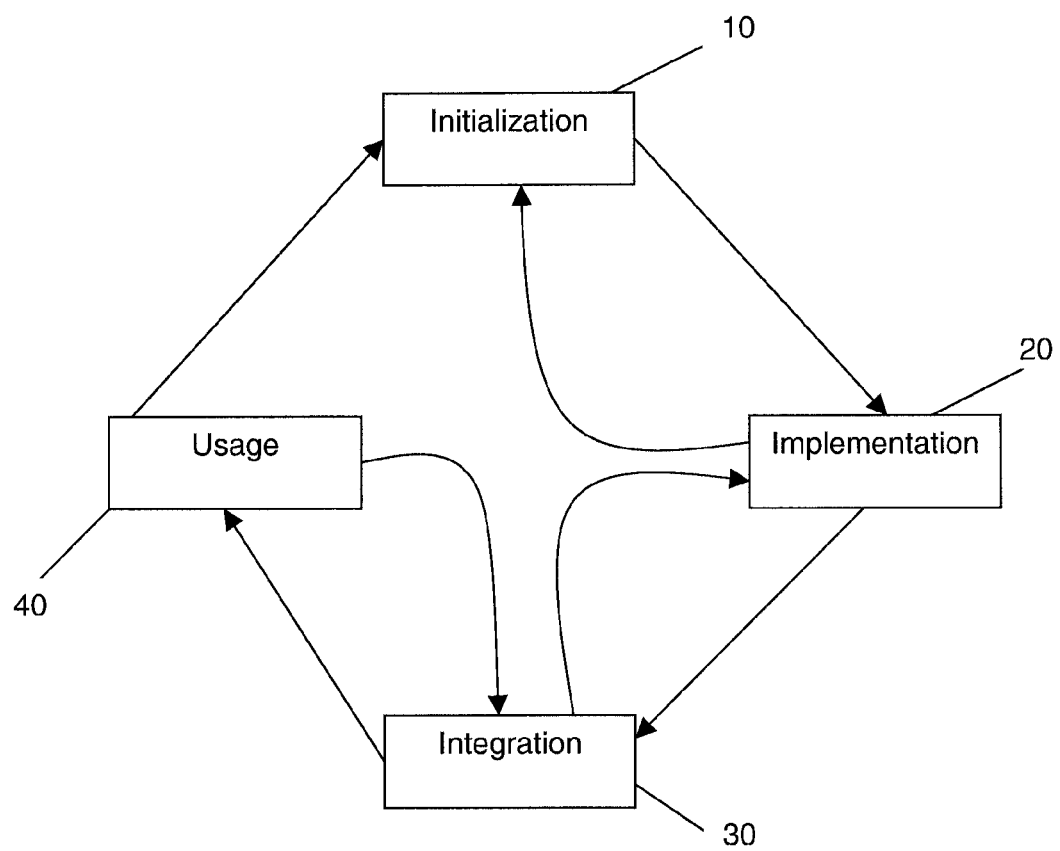
FIG. 1 shows an general overview of processes involved in a system and method for visual representation of sound.
Figure 2:
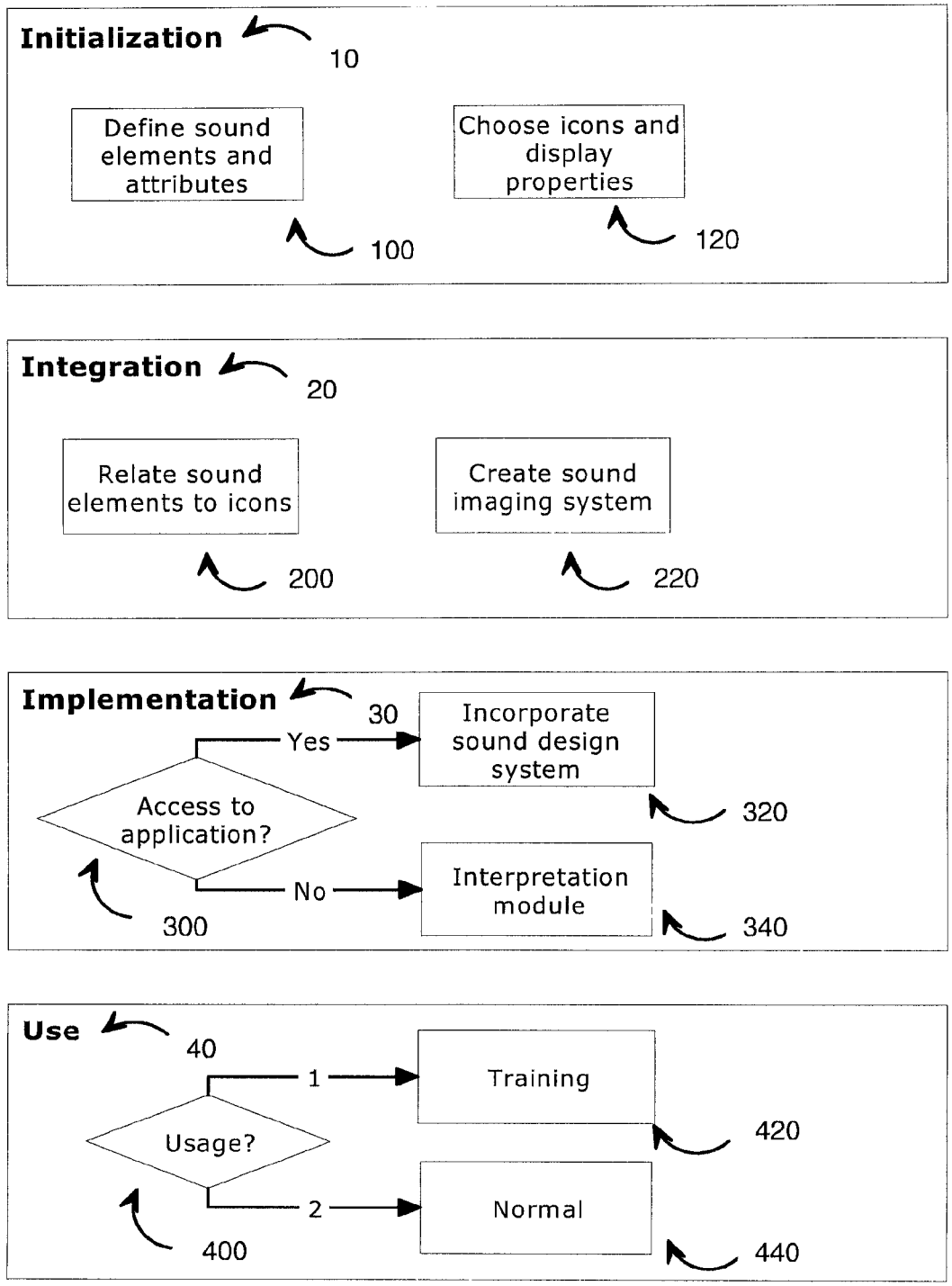
FIG. 2 shows further detail of the overview of processes involved in a system and method for visual representation of sound.

An overall approach for creating sound cue visualization for a multimedia application can include four main processes: initialization, integration, implementation and usage as shown in FIGS. 1 and 2. As shown in FIG. 1, it will be understood that each process may interact with the other processes and there may be opportunities for feedback and revision between the processes.

In the initialization process 10, one or more sound elements are defined 100 for multimedia content. For example, the multimedia content may be a video game, a virtual environment, a video, a computer application, a TV program, a video program, a movie or other media including sound. A sound element can be any recorded or synthesized audio event. Each sound element represents a sound in the multimedia content and may provide important information to the user. In general, it is preferable that the sound element is classifiable. Sound elements can be defined manually by someone skilled in the art such as a sound engineer. Alternately, it is also possible to use sound classification algorithms to automatically categorize sound effects occurring in the multimedia content.

Each sound element is typically further defined by a set of attributes that are preferably quantifiable in some way. Examples of attributes may be: specificity (the type of sound), direction, loudness (intensity), proximity, emotion/feeling and the like. One of skill in the art will understand that there are a wide variety of attributes that may be assigned depending on the nature of the sound and the application. In some cases, the attributes may be given as meta-data that are generated by a system for visual representation or by a sound engineer or the like to describe the sound. For example, in a game environment, a sound effect of a gunshot may have the filename "gunshot.wav" or may have a meta-data tag "gunshot", "G", "GS", etc. associated with it in the game code. Another form of meta-data may be parameters used to generate the sound synthetically. The attributes may be included as parameters in models that describe the sound element as a function of information provided by a multimedia application. An example of a model is a frequency or wave signature of the sound represented as a function of those audio attributes. For example, in a game, a typical sound wave signature can be defined with the attribute of a "gunshot", the intensity of this wave signature can be associated with an attribute such as proximity. As a result, a player can recognize this sound as representative of a "gunshot" and how close the "gunshot" is intended to be within the game.

As part of the initialization process, a set of visual icons and their display properties are chosen 120. A visual icon or symbol is a symbolic pictorial representation of an idea. Display properties represent rules of visual behavior for the icon. Examples of display properties include size, color, shape, orientation or changes in the appearance of the icon. As a result of having various properties, an icon can display more than one piece of information. One of skill in the art will understand that there are a wide variety of properties that may be assigned depending on the nature of the icon and the application.

Basically, the initialization process involves an identification of the sounds (sometimes called sound cues) in an elemental form and defining one or more attributes of this sound element. A visual symbol is then defined with one or more display properties. The relationship between the audio element and its attributes and the visual symbol and its display properties are created so that the visual symbol display properties are a function of the audio element attributes.

Following initialization, the integration process 20 then relates an icon to one or more sound elements 200. As a result, an icon can display information from more than one sound element. For example, a sound element of a "gunshot" may be identified by a picture of a gun. A concurrent element may be an icon for the shooter. A system designer may be involved in relating the display properties of one or more icons to the attributes of the sound elements, typically together with a set of predetermined rules. In the video game example, the "gun" icon could change color depending on the proximity of the gun shot and the icon may include an arrow indicating the origin of the gun shot. The shape may also indicate the type of enemy/shooter. In some cases, a database may be used to track the relationship between sound elements and their attributes and icons and their respective display properties. Alternatively, such relationships may be coded explicitly in a software program and/or implemented in a hardware device.

In this way, the relationship between sound elements and their attributes and visual elements (icons or symbols) and their display properties is set by the integration process. In some cases, this relationship can be implemented and managed 220 as a sound-imaging system or module.

In the implementation process 30, there are various methods of incorporating the sound imaging module into a multimedia application 300. In a first example method 320, the multimedia application calls a library function that includes the operations of the sound imaging module. This allows the icon to be displayed at the same time as the sound is being generated or played back. The icon information can then be combined with the video information and presented to the user. This method of implementation generally requires direct access to the multimedia application in order to place the sound information needed to make the call to the library function and select the appropriate visual properties. For example, in a gaming system, this method would generally require access to the game program to add/view the sound information (i.e. sound meta-data or the like).

Figure 3:
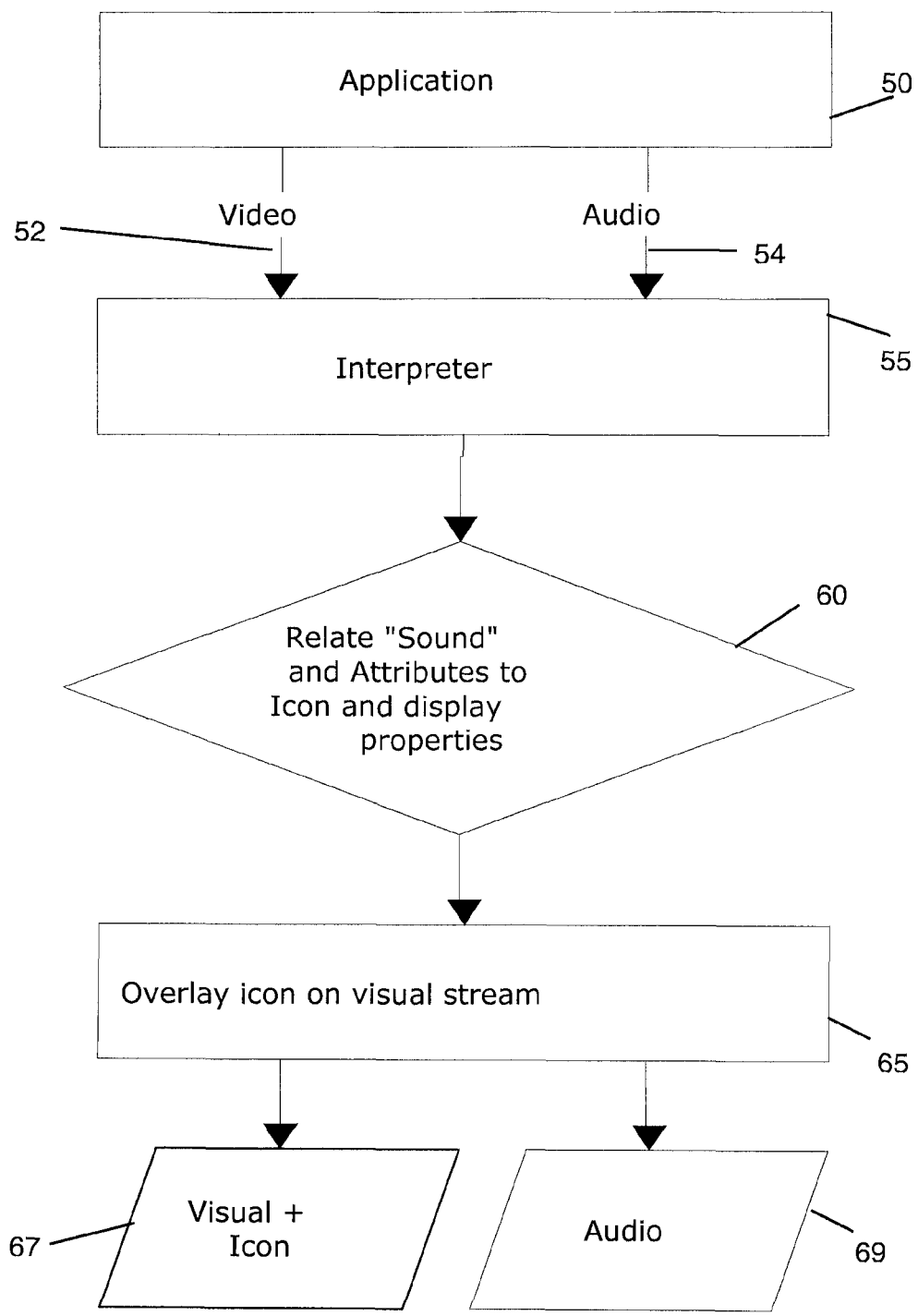
FIG. 3 shows an example system for visual representation of sound involving an interpreter.

In a second example method 340, the video 52 and sound 54 from an application 50 or its meta-data may be passed through an interpreter module 55, as shown in FIG. 3. This interpreter module 55 may be a software module, computing service or device that will analyze and classify the audio stream or the meta-data according to the defined sound elements and their attributes 60, before passing this information to the sound imaging system 65. The icons can then be placed on the video stream from the original application. The output is then the video/visual+icon 67 and the audio 69. In some cases, the audio 69 does not need to be output. In this method of implementation, only the audio stream, video stream and audio meta-data will generally be required rather than access to the whole application. One of skill in the art will understand that this method may preferably be carried out in advance of usage but in some cases may also be carried out in real-time during usage.

Following implementation, the usage process 40 involves the user making use of a multimedia application to view multimedia content. In this process, the multimedia application may provide alternate usage modes for the user 400. For example, in a training mode 420, a user may be allowed to hear the sound and also see its associated icon under a set of controlled conditions so that the user can match/understand the relationship of the audio information with changes in icon display properties. In a normal mode 440, the user can view the icon in conjunction with the normal video information from a multimedia application and interact with the application based on the presence or absence of the audio cues.

Figure 4:
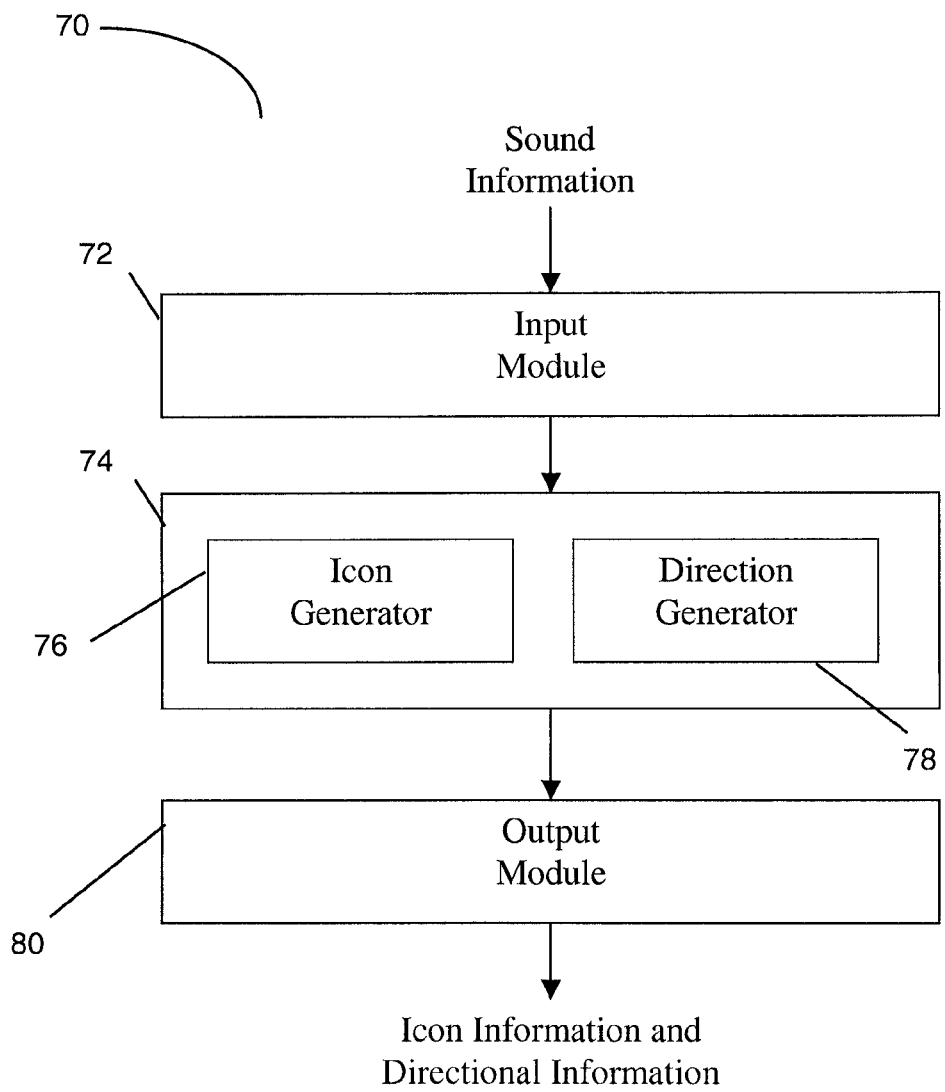
FIG. 4 shows another example system for visual representation of sound.

FIG. 4 shows a block diagram of an example system for visual representation of sound 70. The system 70 includes, an input module 72 for receiving sound information, a sound sign or sound compass generator 74, which includes an icon generator 76 for generating an icon based on sound information input and a direction generator 78 for generating a directional indicator based on the sound information input, and an output module 80 for outputting the icon and directional indicator for use in the multimedia content for eventual display on a display screen or the like. It will be understood that the system shown in FIG. 4 may be utilized within the implementation process or, in some cases, in the usage process. When used in a usage process, it is generally preferable that the appropriate sound information is already embedded in the multimedia content in order to allow more efficient processing.

The following description relates to embodiments of a sound imaging system and method in a video game application.

In the initialization process, sound elements in the video game are identified, for example, a "gunshot". This sound element may include or be given the following attributes: proximity (typically relating to loudness of the sound), direction of source and sound type descriptors (what category of sound it is—i.e. enemy gunshot, what type of gun). In this example, the proximity and directional attributes may be calculated by means of known algorithms and the sound type descriptor can be made available as meta-data that is associated with each sound element. In a particular case, two types of display icons may be chosen: an image of a gun and a directional indicator. The gun icon has, for example, the following display properties: specificity (based on type of gun) and opacity. The display property of the directional indicator is positional information for a pointer. The combination of an icon and another display element such as a directional indicator is sometimes referred to as a sound sign or sound compass.

Figure 5:
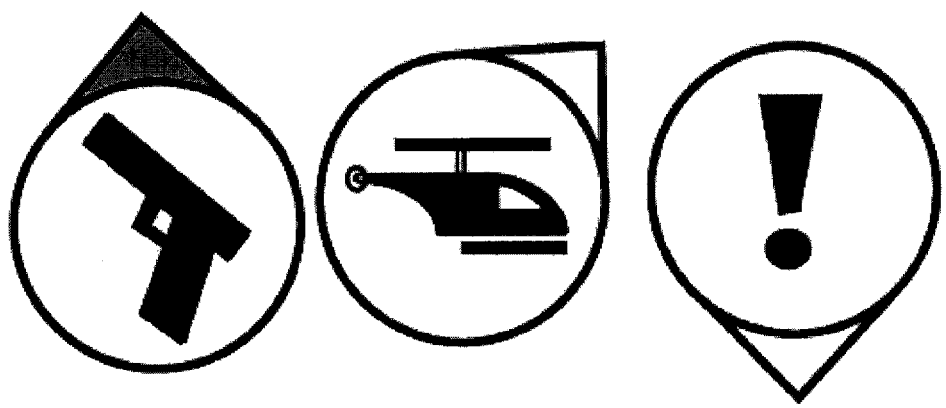
FIG. 5 shows example sound signs.

In the present embodiment, the directional indicator may be a background compass shape and the icon may sit on a layer above the background compass. The background compass is a rotational pointer that indicates a direction of the sound being represented. In this case, the combination of the icon and compass may be referred to as a sound sign or sound compass. Examples are shown in FIG. 5. In this embodiment, a sound sign contains a single rotational pointer and a single icon. However, in alternative embodiments, a sound sign may contain multiple rotational pointers and multiple icons. In some cases, the sound sign can be turned on or off by the player at the game's option screen.

As one particular example in the video game example, it may be possible to develop a standard list of common sound elements in various genres of video games. In this case, it may be possible to develop a list of, for example, the 26 most common and/or important sound effects, and an icon or symbol can be designed for each to correspond to letters of the alphabet for easy implementation as, for example, a font (See FIG. 6). Having said this, It should be understood that embodiments may contain any number of sounds and icons/symbols, and that the mapping between sounds/icons and/or letters or other representation may be implemented by databases, fonts, and other means. The use of a 26 character font in this case is illustrated for ease of implementation. In this case, each letter represents an icon for a sound element. It will be understood that the icon is not designed to be fixed in style, but rather can be flexible in that the stylistic elements can be adjusted to suit the game, while maintaining the meaning of the icon. In this example, each icon has a corresponding alphanumeric key. This is intended so that implementation by a sound designer can be made with minimal effort by merely entering the alphanumeric representing the sound element.

In the integration step, the display properties of the icon are related to the sound element attributes. The relation between the gun icon display properties and the "gunshot" sound element attributes may be as follows: (1) the gun icon opacity may be set as a function of audio proximity, such as the louder the sound element, the more solid the gun icon appears; (2) the image of the gun icon may change depending on the sound type descriptors (e.g. machine gun, shot gun); (3) the relationship between the pointer direction icon display property and the "gunshot" sound element attribute may be that the icon will point to the direction of source as a form of compass based on a directional and proximity algorithm. This relationship can be, for example, encoded as a set of software instructions and accessible as a library call function; which establishes the sound imaging system for this embodiment.

In the present embodiment, the audio property of proximity can be calculated from the (x,y) or (x,y,z) co-ordinates of the player or user within the game space and the source of the sound, or from other forms of spatialized positioning in the sound arrangement of the game or application, including, for example, speaker set-up and sound intensity. The relationship between the proximity and the display property of "opacity" can be controlled as, for example, four level increments. In this case, opacity may be 0%, 25%, 50%, 75% and 100%, with 0% representing no important sound present. It will be understood that the proximity of a sound may be indicated by other means, such as, for example, varying the size of the icon/compass or varying a rate of flashing of the icon/compass based on the proximity or other methods as will become apparent to one of skill in the art. Further, the opacity does not necessarily need to be limited to four levels but may be based on additional levels or some other function of the sound proximity, such as a straight-line function, logarithmic function or the like. Similar considerations can apply to other sound attributes or properties.

For 2D games and media (typically platform or casual games that take place in a 2-dimensional space), the sound sign may act like a clock face, with, for example, 12 rotational settings based on the sound's proximity and direction relative to the player. In a particular case, the sound sign may sit in a particular position, and may then be rotated based on the position of the sound in the two dimensions.

In 3-D games, relevance, proximity and direction of a sound can again be signaled by varying the opacity, size, shape, color, rate of flashing or other properties of the sound sign based on the position of the sound in the three dimensions. For example, increasing proximity of a sound relative to a player might be indicated by increasing opacity of the sound sign. In the 3-D case, the addition of a line at the top or bottom of the sound sign may signal overhead and underfoot sounds to simulate the 3-dimensional sonic space (and perhaps based on surround sound mixing). In some cases, it may be possible to have a 3-D representation of the sound sign, for example a sphere with a directional arrow or the like, rather than using a line at the top or bottom of the sound sign. Certain audio software or engines also offer the user the ability to read positional information in real-time in a game, and thus it is possible to take that positional information and use it to orchestrate the positional information for the sounds.

Particularly in a 3D environment, attenuation cones, which normally are used for adjusting volume for direction and distance, can provide a spatial indicator of when the sound sign is to appear on the screen or be used to vary properties of the sound compass or sound sign.

Other attributes can also be assigned to the "gunshot" sound element, such as the relevance of the sound, sound intensity (related to proximity), sound priority, causal agent (e.g. enemy), and sound length. For example, a sputtering sound may be indicated by a rapid flashing of the sound sign some portion thereof, while sounds heavily treated with effects may show spatial information and may be represented by varying the color, size, shape or texture of the sound sign. Further, background noises such as chirping birds may not be displayed if there are more relevant sounds to be displayed.

In this embodiment, the implementation process may, for example, be carried out by a programmer who has access to the source code of a game. The relationship between the sound elements (gunshot) and the related display icon (sound sign) can then be explicitly defined as a series of computer codes/instructions. As noted above, a sound font may be used that allows a programmer to easily specify a particular icon or sound sign for use with a sound element and meta-data, or the like, may be used for sound attributes that can then relate to display properties. In this sense, the code for the sound sign can act as an external class to be called whenever the game developer wants to implement the code into the game.

Alternately, a gun shot's sound sign could be held in an external file in which the sound sign is always associated with the gun being fired, so the sound designer is able to create or edit the file to indicate which sounds are associated with which symbols, while another external file may hold the details of programming the sound sign's implementation, and the sound designer edits a file to indicate which sounds and attributes are associated with which sound signs and properties.

In the usage process, the user can choose either the training or game playing mode. In game playing mode, the user may switch the audio or visual cues on and off as desired.

Figure 7:
FIG. 7 shows an example screen shot showing sound icons or sound signs.

In a game environment, the sound compass may be stationary, for example, positioned in the lower right hand corner of the screen (see FIG. 7). In the example shown in FIG. 7, three separate sound compasses are displayed at once to represent sound information from different sources. In this way, players can become accustomed to looking in one spot for their audio information. It will be understood that players may also have the option of changing the location of the sound compass. Alternative embodiments may allow for the sound compass (es) to move around or be placed on other areas of the screen automatically in relation to a direction of the sound or based on other factors, such as the activity on the screen or the like. In a particular case, the sound compass may be configured to move with, for example, a gun or other tool that a user is carrying so that the sound compass remains in the user's central field of vision. Further, it will be understood that more than one sound compass may be used to show multiple sounds.

In another embodiment, a sound sign may sit on a layer above a background. A symbol representing the player may also sit on the layer above the background. The combination of the sound sign, the symbol representing the player, and the background may be referred to as a sound map and may operate somewhat like an extended physical map to show the user sounds that may be off the visible screen. The sound map may represent a bird's eye view of the player and its surroundings. The direction the player is facing may be indicated by a directional indicator or the orientation of the sound map. As the player changes direction, the directional indicator or orientation of the sound map can be updated to reflect the change in direction. In the case where multiple sounds are audible to the player, each sound may be represented by symbols that may sit on a layer above the background. In this embodiment, the position of the sound map on the display may be stationary, for example, positioned in the lower right hand corner of the screen. In this way, players can become accustomed to looking in one spot for their audio information. It will be understood that players may also have the option of changing the location of the sound map. Alternative embodiments may allow for the sound map to move around the screen automatically in relation to sound information. The position of the sound sign on the sound map may be based on sound information and player information. For example, the position of the sound sign may be based on the position of the source of the sound relative to the player. Likewise, the appearance of the sound sign may be altered according to sound information, player information, and information about the player's surroundings. For example, the size, opacity, flashing status or other characteristic of the sound sign or icon may be based on the intensity of the sound at the player's location.

Figure 8:
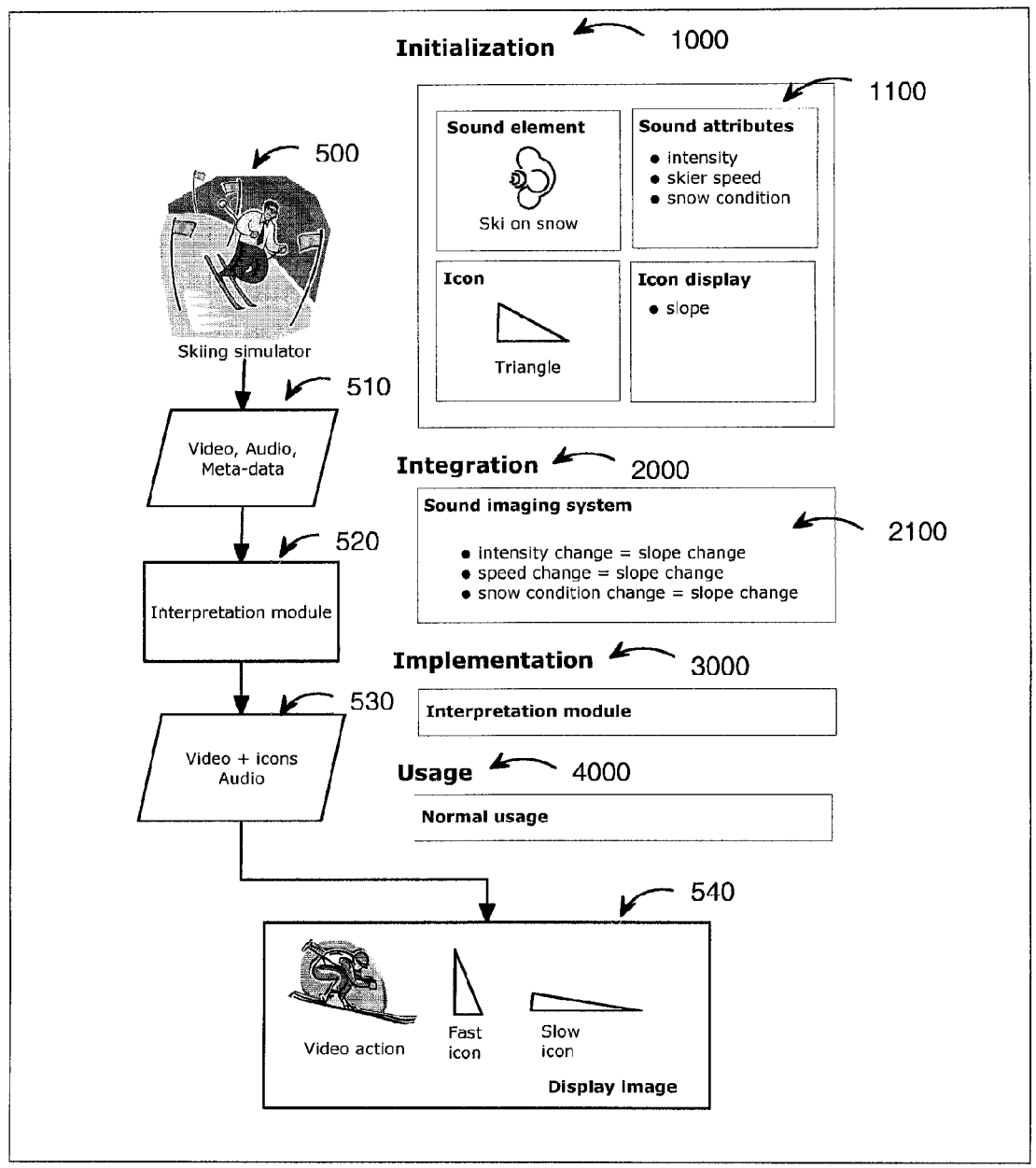
FIG. 8 illustrates an overview of an example of using a system and method of representing sound in a simulation.

In another embodiment, the process and method may be used to represent sound information in a display for a virtual environment or live simulator. For example, a downhill skiing simulator 500. FIG. 8 is a block diagram illustrating the use of the systems and methods herein for a skiing simulator. The initialization process 1000 consists of identifying the sound elements and choosing icons and display properties 1100. In this case, one sound element may be the sound of the skis sliding on the snow. The sound element attributes may consist of the sound intensity, meta-data concerning the speed of the skier and the snow condition. The chosen icon may be a triangle symbol. An icon display property may be defined to be the slope of the triangle. For the integration step 2000, the slope of the triangle may be defined as a function of the following sound element attributes: sound intensity, meta data of the speed of the skier and the snow condition. This relationship between sound element attributes and triangle symbol display properties is captured in a sound imaging system or module 2100, which for this example, may be an external hardware device. In the implementation process 3000, the programmer may not have direct access to the controls within the virtual environment or simulator. However, using method two 340 of the general implementation process 30 (as noted above), the sound imaging module 2100 can take the audio and video component as well as any meta-data 510 from the virtual environment or live simulator and process the audio and meta-data through the interpretation module 520 to provide an output of the video+icons 530 for display as a part of the simulation 540 and the sound sign may be adjusted based on the attributes during usage 4000.

Using the system 70 illustrated in FIGS. 3 and 4 as an example, the system 70 can receive sound information, for example the "skiing sound", at the input 72 and determine the sound attributes either through analysis (how loud are the skiis), or though some meta-data description pertaining to the sound attributes (what is the speed and the type of snow condition), for example using the interpreter 55 of FIG. 3. The system then determines or generates an Icon and an attribute indicator (such as a direction indicator) 60 and 74. In this case, the attribute indicator indicates attributes such as the speed and snow condition rather than direction, which can be shown by the slope of the icon. The system 70 then, using the rules defined in the sound imaging module, generates the appropriate sound sign to be overlaid on to the video stream at the output 80. A user can then see an iconic representation of the skiing conditions based on the interpreted audio cues. For example, a triangle icon with a steep slope may be displayed when the user is experiencing increased speed or travelling through different snow conditions.

Figure 9:
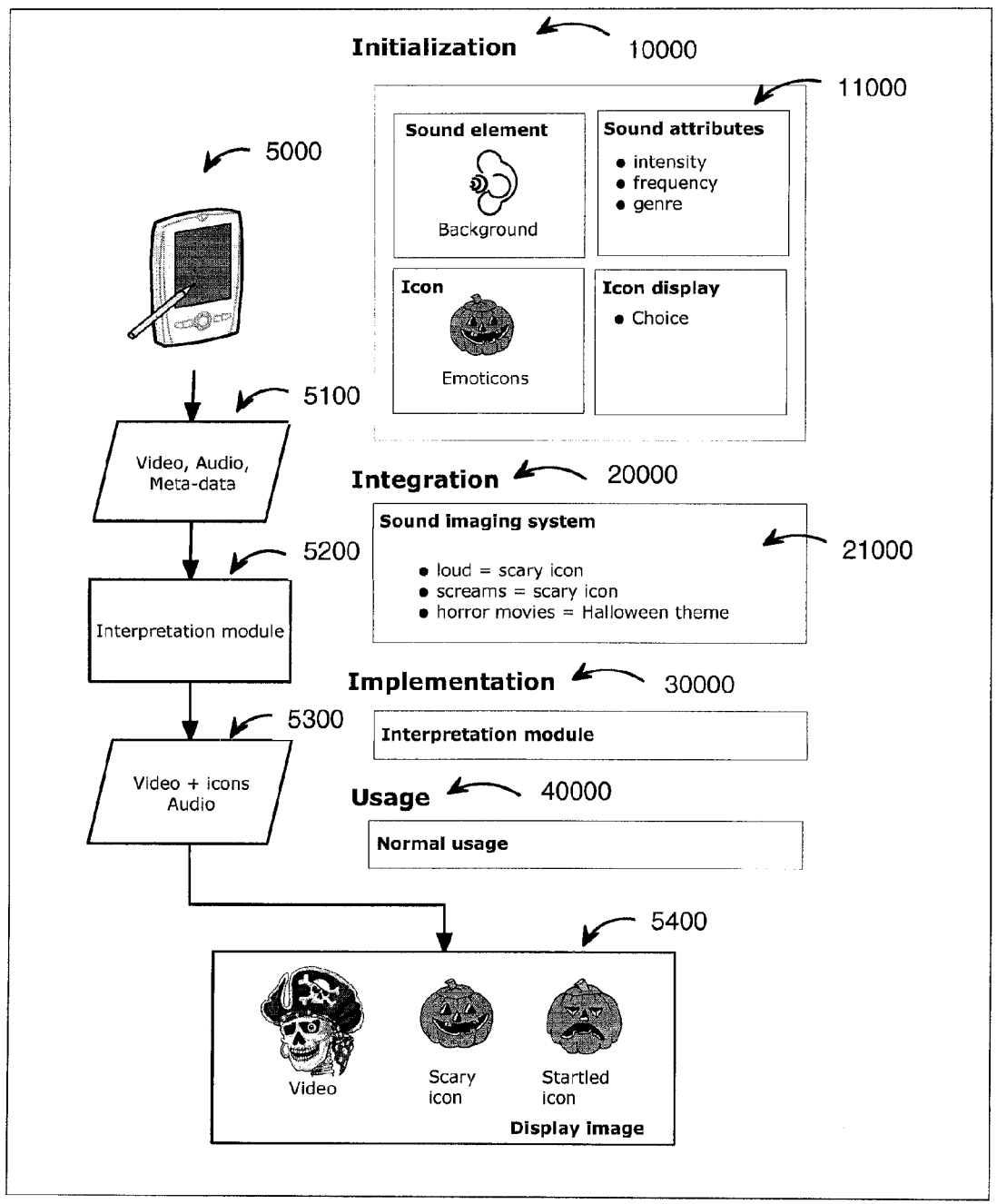
FIG. 9 illustrates an overview of an example of using a system and method of representing sound in a mobile device.

In another embodiment, the system and method may be used to create visual cues for a mobile video device. FIG. 9 illustrates the use of the system and method in this context. In this example, a mobile video device 5000 such as a cell phone or a laptop computer is configured to play a multimedia stream. In this embodiment, when the multimedia content is played on the mobile device 5000, a sound imaging module can be implemented to analyze the audio stream and overlay a sound sign over the video stream to provide a visual indicator for the sound/audio information. In the initiation process 10000, the sound element may be defined to be "video background sound" and the sound element attributes may be defined to be "intensity", "frequency" and a user defined parameter defined as "video genre" 11000. The sound icon may be defined to be a set of emoticons. A display property can then be defined to be the choice of an emoticon. At integration 20000, the relationship between the display property and the sound attributes are defined in a sound imaging system or module 21000, which, in this case, may be a software service. An example of the type of relationship can be: a happy emoticon is displayed when the video genre is set to be comedy and the sound intensity and frequency reaches an appropriate threshold level.

In the implementation process 30000, the sound imaging module is installed in a mobile video device. This sound imagining module 21000 allows the user to define the genre of the multimedia content then intercepts the audio and video stream as the multimedia content is being played. In usage 40000, the sound imagining module 21000 analyzes the media stream 5100 via the interpreter 5200 and based on the defined relationships between the sound qualities and icon display properties, generates the appropriate icon for overlay on the video stream 5300. The new video stream and the audio stream can then be displayed to the user 5400.

Symbolic representations of important sound data can also be implemented into other types of multimedia applications. For example, a multimedia online learning system might include sounds to indicate to the user when to pause a video clip, or may accompany educational animations or interactive simulations. Sounds may be used to indicate where a user can zoom in on an area or obtain further information about an object. In these cases, a flexible set of icons/symbols or a font where the user can edit icons, symbols or glyphs to their own needs to incorporate into their code can be quickly and easily implemented. Other examples include military applications, such as for use with heads-up displays, and industrial applications, such as warning systems for loud environments or devices to accommodate hearing impairment.

It is believed that developing a scientific way of portraying auditory information could provide a new industry standard that could be included in various types of multimedia content, including games, TV, movies, video (as described above) and incorporated into future potential industry requirements. This would mean that those programming and using the multimedia system would not have to learn a new way of expressing or interpreting sound signs in each new content project, and assist with allowing games to have an accessibility standard enabling hearing impaired users to enjoy the content in the same manner as currently enjoyed by those without hearing impairment. A standard set of symbols would be intended to help to reduce confusion (for producers as well as consumers), and enable accessibility, as well as promote accessibility as a genuine part of the production process. To developers, there is a savings in time and money in regard to spending on developing accessible products, and a likelihood that consumers will develop a preference for products that have adopted a standard.

The embodiments herein are intended to provide a symbolic way of representing sound in multimedia content/applications whereby predetermined sounds may be tagged by a sound designer with additional metadata to connect them to a sound sign or sound compass to display on screen, which can indicate attributes relating to the sound such as position/direction, identity, timing, proximity information and the like to the audience.

It will be understood that there may be modifications to the embodiments described herein as will be understood by one of skill in the art. For example, the sound compass may have an alternate shape such as a square, triangle, hand-shape or the like. Further, the directional indication need not be a separate element, and may be a part of the icon, such as an angle of a triangle icon, an arrow shape, a finger on a hand icon, a 3D arrow or other element indicating direction in any way.

It will further be understood that the embodiments may be implemented as systems or methods and may be implemented in hardware or software or a combination thereof. When implemented using software, it will be well understood that the software may comprise computer readable instructions on a physical media which, when executed by a computing device, cause the computing device to perform the required functions.

We claim:

1. A method of visual representation of sound, the method comprising:
   obtaining sound information, wherein the sound information comprises information related to the type of sound and information related to the direction of the sound;
   generating an icon based on the information related to the type of sound;
   generating a directional indicator based on the information related to the direction of the sound, wherein the generating the directional indicator comprises:
      determining a direction with regard to a user's viewpoint based on the information related to the direction of the sound; and
      generating the directional indicator to point in the determined direction; and
   displaying the icon and the directional indicator on a display screen.

2. The method of claim 1, wherein the sound information further comprises at least one additional attribute related to the sound.

3. The method of claim 2, wherein the generating an icon based on the sound information comprises:
   generating the icon based on the information related to the type of sound; and
   adjusting a property related to the icon based on the at least one additional attribute related to the sound.

4. The method of claim 3, wherein the at least one additional attribute related to the sound comprises at least one of a variable representing the proximity of the sound, a variable representing the relevance of the sound, a variable representing the intensity of the sound, or a variable representing the pitch of the sound, and the property related to the icon comprises at least one of opacity, flashing, color, or size.

5. The method of claim 1, wherein the information related to the type of sound comprises an alphanumeric symbol that corresponds with an icon representing the type of sound in a database.

6. A system for visual representation of sound, comprising:
   an input module for receiving sound information, wherein the sound information comprises information related to the type of sound and information related to the direction of the sound;
   an icon generator for generating an icon based on the information related to the type of sound received from the input module;
   a direction generator for generating a directional indicator based on the information related to the direction of the sound received from the input module, wherein the direction generator is configured to:
      determine a direction based on a user's viewpoint from the information related to the direction of the sound;
      generate the directional indicator to function together with the icon and point in the determined direction; and
   an output module for outputting an icon and a directional indicator received from the icon generator and direction generator.

7. The system of claim 6, wherein the sound information further comprises at least one additional attribute related to the sound.

8. The system of claim 7, wherein the icon generator is configured to:
   generate the icon based on the information related to the type of sound; and
   adjust a property related to the icon based on the at least one additional attribute related to the sound.

9. The system of claim 8, wherein the additional attribute related to the sound comprises a variable representing the proximity of the sound, and the property related to the icon comprises opacity.

10. The system of claim 9, wherein the icon generator is configured to adjust a property related to the icon based on the at least one additional attribute related to the sound by:
    determining a distance between a representation of a user and a source of a sound; and
    adjusting the opacity of the icon to be more or less opaque based on the sound being more proximate.

11. The system of claim 7, wherein the information related to the type of sound comprises an alphanumeric symbol that corresponds with an icon representing the type of sound in a database.

12. A method of visual representation of sound, the method comprising:
    obtaining sound information;
    generating an icon based on the sound information;
    generating a directional indicator based on the sound information; and
    displaying the icon and the directional indicator on a display screen wherein the directional indicator comprises at least one rotational pointer configured to indicate a direction of a sound being represented by the icon.

13. The method of claim 1, wherein the directional indicator and the icon are positioned in a fixed location of the display screen.

14. A method of visual representation of sound, the method comprising:
    obtaining sound information;
    generating an icon based on the sound information;
    generating a directional indicator based on the sound information; and
    displaying the icon and the directional indicator on a display screen wherein a plurality of directional indicators are generated based on the sound information and the plurality of directional indicators are associated with the icon.

* * * * *